2,919,196
FATTY PRODUCTS

Hendrik Jan Duin, Zwijndrecht, and Jacob Arie Schaap, Dordrecht, Netherlands, assignors to Lever Brothers Company, New York, N.Y., a corporation of Maine No Drawing. Application February 23, 1955
Serial No. 490,111

Claims priority, application Great Britain
February 26, 1954

21 Claims. (Cl. 99—123)

This invention relates to fatty products and more particularly to edible fatty products, and also to their methods of preparation. Still more particularly it relates to edible fatty products suitable for use as butter substitutes.

The invention consists in preparing a fatty product comprising preparing a highly packed oil in water emulsion by adding oil to an aqueous phase at an elevated temperature with intensive stirring, the emulsion having dissolved therein a water soluble emulsifying agent, causing partial solidification of the dispersed phase and effecting partial phase inversion of the dispersion by mechanical working, said emulsifying agent being on the one hand sufficiently hydrophilic to allow the preparation of a highly packed oil in water emulsion and on the other hand sufficiently lipophilic to stabilize a partially inverted oil in water emulsion.

The oil content of a highly packed oil in water emulsion is normally at least 74% by weight. For practical purposes the oil content will be at least 80%, particularly when manufacturing margarine and butter substitutes.

The emulsifying agent may be either a single emulsifier having the desired hydrophilic and lipophilic properties or a combination of emulsifiers of which at least one has hydrophilic properties and at least one other has lipophilic properties so that the combination has the desired hydrophilic and lipophilic properties.

It has been proposed to prepare a stable oil in water emulsion containing at least 50% by weight of oil by emulsifying a fatty oil phase and an aqueous phase in the presence of an emulsifier consisting of a fatty acid substituted protein hydrolysate. Such an emulsion may, for instance, be prepared by stirring the oil or liquefied fat into the aqueous phase, for example, at a temperature of 60° C. and homogenising the emulsion.

The stable highly packed oil in water emulsion for use in the present invention may be prepared with the aid of the said emulsifier.

The emulsion should be prepared at elevated temperatures to ensure that the oil is completely liquid, and to ensure that the emulsion can be stirred sufficiently intensely. The temperatures to be used depend on the composition of the oil and the viscosity of the emulsion. This latter property is governed to some extent by the nature of the emulsifying agent. In many cases temperatures in the neighbourhood of 60° C. have been found suitable, but in some cases a temperature of 40° C. or even less may be used. Sometimes temperatures approaching a 100° C. may be used. It is thus possible to pasteurize or sterilize the oil in water emulsion. Intensive stirring may be effected by any suitable apparatus, for instance a turbo mixer working at 3000 revolutions per minute. Preferably the emulsion after having been prepared is homogenized.

A highly packed emulsion means an emulsion in which substantially every particle of the dispersed oil phase is in contact with adjacent particles.

The dispersed oil phase in the highly packed oil in water emulsion is solidified by cooling this emulsion. To effect phase inversion the cooled emulsion is subjected to mechanical working at a temperature well below the melting point of the fat. Solidification and phase inversion may be carried out simultaneously, for example by cooling the oil in water emulsion with stirring. More specifically, the highly packed oil in water emulsion may be cooled to a temperature below 10° C., then reheated to a temperature between 10° and 20° C. and partial phase inversion effected by mechanical working. It may also be cooled to a temperature below 20° C. and then mechanically worked. Alternatively the highly packed oil in water emulsion may first be cooled down to a temperature of about 35° C. and mechanical working applied, simultaneously with chilling. Mechanical working only becomes effective after sufficient crystallization of the oil phase has taken place.

The highly packed oil in water emulsion may be prepared with the aid of a single oil in water emulsifier or with the aid of a combination of emulsifiers, at least one of which is an oil in water emulsifier. When a single emulsifier is used it should on the one hand be sufficiently hydrophilic to allow the preparation of a highly packed oil in water emulsion and on the other hand sufficiently lipophilic to stabilize a partially inverted oil in water emulsion.

In orther words, on the one hand the emulsifier should be sufficiently hydrophilic to allow the preparation of a highly packed oil in water emulsion and on the other hand its hydrophilic properties should be sufficiently reduced in the cooled emulsion to allow partial phase inversion. The desired properties may be obtained by choosing an emulsifier which is soluble in the aqueous phase at the higher temperatures at which the highly packed oil in water emulsion is prepared, but is only partially soluble in the aqueous phase at the lower temperatures at which the partial phase inversion is effected.

Each emulsifier, moreover, only gives the desired results when the pH of the aqueous phase is within a range which is characteristic of the emulsifier. This pH is generally within the range from 5 to 11.

A number of oil in water emulsifiers are well suited for preparing a highly packed water in oil emulsion but emulsions containing them cannot be partially inverted to the right degree on cooling and working. In such cases an additional emulsifier of a different type has to be used. When such a combination of emulsifiers has to be used, at least one should have pronounced hydrophilic properties while at least one should have lipophilic properties. An emulsifier which in itself is too strongly hydrophilic and therefore does not possess the desired hydrophilic and lipophilic properties for the cooled and partially inverted emulsion has to be combined with another emulsifier with lipophilic properties, thus obtaining the desired properties.

Depending on the lipophilic character of the emulsifier used the proportion of hydrophilic and lipophilic emulsifiers have to be such as to impart the desired hydrophilic and lipophilic properties to the agent.

Emulsifiers for use in the invention may be anionic or nonionic surface active agents.

Examples of anionic surface active agents are higher fatty acids as such or partly or completely neutralized with a base. Suitable bases are the hydroxides of alkali metals or of ammonium or substituted ammonium radicals. Agents such as sodium palmitate, sodium stearate or sodium oleate can be used as single emulsifiers provided their pH value is kept between 7 and 11, preferably above 7.5. When a salt of a lower fatty acid, such as sodium laurate is used at a pH value of 8, it has to be combined with a lipophilic emulsifier such as the partial ester of polyglycerol and intermolecularly esterified ricinoleic acid, or sorbitan monooleate, or glycol monooleate.

Other examples of suitable anionic surface active agents are fatty acid substituted aminocarboxylic acids or derivatives thereof.

When used as single emulsifiers these compounds are of the general formula

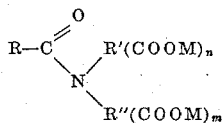

in which

R is a saturated hydrocarbon radical with at least 14 and for example up to 24, and preferably 16 to 18 carbon atoms,
R' is a hydrocarbon radical with from 1 to 5 carbon atoms,
R'' is hydrogen or a hydrocarbon radical with from 1 to 5 carbon atoms, which may be linked to R',
M is hydrogen, alkali metal, ammonium or a substituted ammonium radical,
$m$ is 0 to 3,
$n$ is 1 to 3 and 2 or 3 when R'' is hydrogen.

Such substances are for example sodium N-stearoyl sarcosine, sodium N-stearoyl glutaminate, sodium N-stearoyl proline, which can all be used at a pH value of 5 and higher, or sodium N-stearoyl glycine, which can be used at a pH value of 7 and higher.

When used in combination with lipophilic emulsifiers the fatty acid substituted aminocarboxylic acids or their derivatives are of the general formula

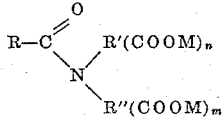

in which

R is a saturated hydrocarbon radical with from 8 to 13 carbon atoms or an unsaturated hydrocarbon radical with at least 8, for example 8 to 24 carbon atoms,
R' is a hydrocarbon radical with from 1 to 5 carbon atoms,
R'' is hydrogen or a hydrocarbon radical with from 1 to 5 carbon atoms, which may be linked to R',
M is hydrogen, alkali metal, ammonium or a substituted ammonium radical,
$m$ is 0 to 3, and
$n$ is 1 to 3.

Such substances are for example sodium N-lauroyl sarcosine or sodium N-oleoyl sarcosine. They have to be combined with a lipophilic emulsifier such as the partial ester of polyglycerol and intermolecularly esterified ricinoleic acid, sorbitan monooleate or glyceryl monooleate. Combinations which have been found especially suitable are sodium N-oleoyl sarcosine or sodium N-lauroyl sarcosine with the partial ester of polyglycerol and intermolecularly esterified ricinoleic acid at a pH value of 6 and sodium N-oleoyl sarcosine with sorbitan mono-oleate at a pH value of 6.

Still other examples of suitable anionic emulsifiers for use in the invention are the partial esters of higher fatty alcohols and polybasic inorganic acids such as phosphoric acid. For example monostearyl phosphate may be used as a single emulsifier.

Examples of nonionic emulsifiers for use in the invention are partial esters of fatty acids and polyoxyalkylene derivatives of polyvalent alcohols such as for examples the partial lauric acid ester of polyoxyethylene sorbitan, partial esters of fatty acids and condenser polyvalent alcohols, such as for example hexaglycerol monolaurate, or polyoxyalkylene derivatives of higher fatty alcohols such as for example octadecylpolyoxyethylene glycol with more than 20 oxyethylene groups. The nonionic emulsifiers have to be combined with lipophilic emulsifiers, such as for example partial polyglycerol esters of intermolecularly esterified ricinoleic acid. One of the advantages of the use of nonionic emulsifiers is that they can mostly be used over a wide range of pH values, for example 5 to 11.

It will be clear from the foregoing that the agents denoted as "single emulsifiers" may also be used in combination with each other. Likewise, wherever a combination of emulsifiers as described above is necessary, more than one emulsifier of the hydrophilic type may be used in combination with more than one emulsifier of the lipophilic type.

The emulsifiers may also be used together with thickening agents, such as for example carboxymethylcellulose.

It is believed that the mechanism of the process of the present invention is as follows:

The oil in water emulsions containing at least 74% oil are believed to consist of oil globules, each of which is totally surrounded by an aqueous film containing the emulsifying agent acting as an oil in water emulsifier. In between these oil globules is an external phase containing pockets of water smaller in size than the oil globules. Most of the water in the emulsion is in the form of pockets because in a highly packed oil in water emulsion containing at least 74% of oil the films surrounding the adjacent oil globules of the above described structure are in contact with each other at at least one point on their surfaces. On cooling the highly packed emulsion of this structure, fat crystals form within the oil globules and weaken the aqueous film at some points, but without destroying the essential oil in water character of the highly packed emulsion. The resultant structure is, however, considered to be unstable. It can be reverted to a stable oil in water emulsion, for example by the addition of cold water. The added water does not rupture the weakened films but flows between the globules to force them apart and form a thin oil in water emulsion. However, if the material of unstable structure is mechanically worked the weakened parts of the aqueous films are ruptured so that oil from one globule can coalesce with oil from another to form ultimately a continuous phase. At the same time the water pockets described above become water globules dispersed in the oil phase. This process may be assisted by the water in oil emulsifying action of any emulsifying agent present. However, the process does not go to completion because of the oil in water emulsifying action of the emulsifier still present. The resultant structure therefore consists of water globules in a continuous oil phase and of oil globules surrounded by an aqueous film, the latter globules being also dispersed in the continuous oil phase. It goes without saying that "oil" in this context means a partly solidified oil. This structure approximates to the structure of natural butter and for this reason the product formed after partial phase inversion has to a large measure the structure characteristics normally associated with natural butter.

If required, water retentive agents may be used in the preparation of the fatty products. Examples of such water retentive agents are monoglycerides of higher saturated fatty acids, for example, the monoglycerides prepared from hardened palm oil.

Other additives conventionally used in the manufacture of margarine, for example, lecithin and Palsgaard's emulsion oil, may be used for making fatty products according to the process of the invention. The action of such substances, however, is not always the same when used in the products of the invention as when used in conventional margarine.

In the specific embodiment of the invention concerned with the making of a butter substitute, the fat from which the original oil in water mixture is made may be butterfat or a fat mixture similar to the fat mixtures used in margarine manufacture. Such fat mixtures when used in the process of the invention tend to give a stiffer product than margarine made from them in the ordinary way. It is thus possible to use in the process of the invention fat mixtures which, when used in the ordinary processes of manufacturing margarine would give a product which is too soft.

When using the process of the invention it is found that the texture of the resultant dispersion in general is different from and better than that of reconstituted butter or of margarine prepared in the conventional manner, that is prepared by emulsifying an aqueous phase in butterfat or in margarine fat respectively, followed by cooling and mechanical working. The temperature range over which the butter substitute of the invention retains a pliable and elastic texture tends to be greater than that encountered in the case of a conventional margarine or reconstituted butter prepared from the same fat. Whereas margarine or reconstituted butter becomes brittle and is no longer plastic at temperatures between 5 and 10°C, the product of the invention in general remains pliable and plastic, but at the same time elastic, like genuine butter. At about 20°C it shows a tendency to soften, but also tends to retain body like genuine butter, whereas reconstituted butter prepared in the conventional manner becomes very soft at 20°C.

The present invention, therefore, permits the manufacture of butter substitutes which in regard to texture at various temperatures in general resembles butter more closely than does reconstituted butter or margarine manufactured in the conventional manner. The nature and texture of the fat as such tend to be less critical in the case of butter substitutes prepared according to the invention than in conventional processes, and accordingly a greater variety of fat mixtures may be made into butter substitutes of a satisfactory texture.

The oil in water emulsions described in this specification may be prepared according to the method of copending application No. 490,112.

The invention will now be illustrated by means of the following examples. In all of these examples when the size of the oil particles in the oil in water emulsion is mentioned, this size is ascertained by observing the emulsion after dilution with water of the same temperature as the emulsion under the microscope. In the final dispersions having an external fat phase the presence or absence or "loose" or "free" water is ascertained by contacting a freshly cut surface of a sample of the product with the so-called "loose water" paper. This paper is described by S. Knudsen and A. Sorensen in "Maelkeritidende," Vol. 47, page 903 (1934). The method of detecting "loose" water consists of contacting a freshly cut surface with filter paper impregnated with 0.2% bromo phenol blue and bromo cresol green, and powdered with sodium bicarbonate; such paper is yellow, and in contact with water droplets shows blue spots. In all the examples pH values were measured at 50°C., with the potentiometer. Also in all the examples stirring was carried out by a turbo-mixer rotating at 3000 revolutions per minute.

*Example 1*

An aqueous phase was prepared by dissolving one part of the stearoyl sarcoside (the product named Sarcosyl-S and sold by the Alrose Chemical Inc.) in distilled water, containing a sufficient amount of sodium hydroxide to neutralize it. Citric acid was added to this aqueous phase to bring the pH between 5 and 6 and distilled water was added to make it up to 40 parts. Butterfat was obtained by gently heating butter and filtering the separated fat layer. An 80% oil in water emulsion was prepared by slowly adding 160 parts melted butter, at first in small portions, to the above mentioned aqueous phase at 60° C. with stirring. The oil in water emulsion obtained was homogenized in two stages using 140 and 60 atmospheres respectively.

The resultant emulsion was stable and the dispersed fat particles were mainly from 1 to 5 microns with only a small fraction up to 25 microns. After keeping at 0–3° C. for three days so as to make the dispersed fat crystallize, the emulsion was allowed to attain a temperature of 13° C. It was then mechanically worked by passing several times through perforated plates. This effected partial phase inversion since the resultant butter substitute had fat as the external phase. When contacted with "loose water paper" it did not colour the paper at all showing the absence of free moisture. The texture of the resultant butter substitute was pliable and plastic but at the same time in a sense elastic, like genuine butter. Magnified 350 times under the microscope the texture was rather more even and finer than that of genuine butter, even after keeping one month. This texture was quite different from that of a conventional margarine.

*Example 2*

An emulsifier was prepared by boiling 100 parts gelatine with a solution of 50 parts NaOH in 300 parts water for five hours and concentrating the liquid to a content of 60% by weight dry matter. The hydrolysate obtained contained 14.5% by weight α-amino acid nitrogen calculated on the gelatine. Crude fatty acid chloride prepared from 100 parts technical stearic acid and 18 parts phosphorus trichloride were added with stirring, the rate of flow being adjusted to keep the reaction mixture at 65–70° C. The reaction mixture was kept at this temperature for one hour. The final reaction product contained 27.5% moisture and was a paste. An aqueous phase was prepared by dispersing 6.2 parts of the moist emulsifier obtained in 43.8 parts water and adding citric acid to pH 6.2.

An 80% oil in water emulsion was prepared by the procedure described in Example 1. The butter substitute obtained from it by partial phase inversion as described in Example 1 had the properties of the substitute prepared in that example.

*Example 3*

The procedure for preparing the emulsion as described in Example 2 was carried out using the same aqueous phase to prepare a 75%, 80% and 85% oil in water emulsion of the same butterfat and a 75%, 80% and 85% oil in water emulsion of margarine fat. The margarine fat had either a composition (*a*) or composition (*b*) as follows:

| Composition (*a*): | Percent |
|---|---|
| Soybean oil | 22.5 |
| Coconut oil | 18 |
| Palm kernel oil | 10 |
| Hardened whale oil, M.P. 35° C. | 22.5 |
| Hardened palm oil, M.P. 45° C. | 10 |
| Lard | 4 |
| Palm oil | 13 |
| Composition (*b*): | |
| Cotton oil | 19 |
| Coconut oil | 18 |
| Palm kernel oil | 9 |
| Palm oil | 27 |
| Hardened whale oil, M.P. 35° C. | 18 |
| Hardened palm oil, M.P. 45° C. | 9 |

The properties of the resultant oil in water emulsions and also of the final butter substitutes obtained after mechanically working the emulsions as described in Example 1 were similar to those described under that example.

*Example 4*

The procedure of Example 2 was carried out with the same aqueous phase and the same butterfat or margarine fat mentioned under Example 3. However, 0.25% technical monoglycerides prepared from completely hardened palm oil was incorporated in the fat phase. The properties of the emulsions and of the final butter substitutes obtained were similar to those described under Example 1.

*Example 5*

80% oil in water emulsions were prepared as in Example 2 with margarine fats of the compositions mentioned under Example 3. The aqueous phase, however, contained 0.10, 0.25, 0.50, 0.75, 1 and 2% of sodium stearoyl sarcoside at a pH of 5.2, 0.25 and 1.0% sodium salt of stearoyl proline at a pH of 6.2 or 0.50% sodium stearoyl glutamate at a pH of 6.0. The emulsions had the same suitable properties as under Example 1. After mechanical working these emulsions gave butter substitutes which had the same pliable texture as those formed in Example 1. Also they were smooth and plastic though at the same time elastic like genuine butter. With sodium stearoyl sarcoside the best results were obtained over 0.25 to 1%.

*Example 6*

An aqueous phase was prepared by dissolving 3.75 parts of stearoyl sarcosine in 38 parts of hard water (12° D.) and neutralising the stearoyl sarcoside with 5.6 ml. 2 N sodium hydroxide. 50 parts of buttermilk and 2.5 parts of salt were then added. The pH of this aqueous phase was 6.2. 80% oil in water emulsions prepared with this aqueous phase and margarine fat gave butter substitutes with the same butterlike properties as the butter substitutes prepared in the foregoing examples.

*Example 7*

Similar emulsions to those already described were prepared using an aqueous phase containing sodium stearoyl phosphate at a pH of 6, and margarine fat having the compositions described in Example 3. The same good results were obtained.

*Example 8*

An aqueous phase, containing 0.25% of sodium oleate or 0.5% sodium stearate was prepared by dissolving the appropriate acid in water containing sufficient sodium hydroxide to neutralize the acid. Citric acid was added to the solution to bring the pH to 8.0. The mixture was then made up to 50 parts and contained soap which was partly in the form of acid soap. 200 parts of melted margarine fat having one of the compositions given under Example 3 were dispersed in 50 parts of the aqueous phase at between 60 and 70° C., and the emulsion homogenized. After standing overnight at 5° C. the emulsion was passed several times through a perforated plate. A plastic butter substitute having fat as the external phase was obtained. This butter substitute could not be diluted with water but could readily be diluted with oil. The texture was more like that of genuine butter than of reconstituted butter or margarine made in the conventional manner.

*Example 9*

The procedure of Example 8 was carried out using an aqueous phase containing 0.5% sodium oleoyl sarcoside and margarine fat of one of the compositions given under Example 2. 0.5% sorbitan-mono-oleate (a product from the Atlas Co. known under the name of "Span 80") was incorporated in the product. A butter substitute with similar properties to that prepared in Example 8 was obtained.

*Example 10*

The procedure of Example 8 was carried out using an aqueous phase containing 0.5% sodium laurate and 0.5% of the partial ricinoleic ester of triglycerol incorporated in the margarine fat. The same good results described in Examples 8 and 9 were obtained.

*Example 11*

The procedure of Example 8 was carried out with an aqueous phase containing 2% polyoxyethylene-sorbitol-monolaurate (the product known under the name "Tween 20" and sold by the Atlas Powder Company) and having a pH of about 6. 1% of the partial ricinoleic ester of triglycerol was incorporated in the fat phase. The same good results as described in Examples 8, 9 and 10 were obtained.

*Example 12*

The procedure of Example 11 was carried out using an aqueous phase containing 0.5% octadecyl-polyglycolether (the product known under the name of "Emulsogen-O" and sold by the Anorgana Company, Germany). 0.5% glpcerol mono-oleate was incorporated in the fat phase. The same good results as described in Examples 8, 9, 10 and 11 were obtained.

*Example 13*

The procedure of Example 12 was carried out using an aqueous phase containing 2% hexaglycerol-monolaurate. 1% of the partial ricinoleic acid of triglycerol was incorporated in the margarine fat and the same good results as described in Examples 8, 9, 10, 11 and 12 were obtained.

We claim:

1. A method of preparing a fatty product comprising preparing a highly packed oil in water emulsion containing at least 74% by volume of oil by adding a fatty oil to an aqueous phase at an elevated temperature at which the oil is liquid and in any case no greater than 100° C. with intensive stirring, in the presence of a water soluble emulsifying agent, the aqueous phase having a pH within the range of 5 to 11 causing partial solidification of the dispersed phase by cooling and effecting partial phase inversion of the dispersion by mechanical working, said emulsifying agent being sufficiently hydrophilic to allow the preparation of the highly packed oil in water emulsion and sufficiently lipophilic to stabilize the partially inverted oil in water emulsion.

2. A method of preparing a fatty product comprising preparing a highly packed oil in water emulsion containing at least 74% by volume of oil by adding oil to an aqueous phase at an elevated temperature at which the oil is liquid and in any case no greater than 100° C. with intensive stirring, in the presence of a water soluble emulsifying agent, the aqueous phase having a pH within the range of 5 to 11 cooling the oil in water emulsion to below 10° C., reheating to a temperature between 10 and 20° C. and effecting partial phase inversion by mechanical working, said emulsifying agent being sufficiently hydrophilic to allow the preparation of the highly packed oil in water emulsion and sufficiently lipophilic to stabilize the partially inverted oil in water emulsion, and said oil being a fatty oil which is sufficiently crystallized at said temperature of 10–20° C. to permit partial phase inversion by mechanical working.

3. A method of preparing a fatty product comprising preparing a highly packed oil in water emulsion containing at least 74% by volume of oil by adding oil to an aqueous phase at an elevated temperature at which the oil is liquid and in any case no greater than 100° C. with intensive stirring, in the presence of a water soluble emulsifying agent, the aqueous phase having a pH within the range of 5 to 11 cooling the oil in water emulsion to below 25° C. and simultaneously cooling further to a temperature not below 10° C. and effecting partial phase inversion by mechanical working, said emulsifying agent being sufficiently hydrophilic to allow the preparation of the highly packed oil in water emulsion and sufficiently lipophilic to stabilize the partially inverted oil in water emulsion, and said oil being a fatty oil which is sufficiently crystallized at said temperature below 25° C. to permit partial phase inversion by mechanical working.

4. A method of preparing a fatty product comprising preparing a highly packed oil in water emulsion containing at least 74% by volume of oil by adding a fatty oil to an aqueous phase at an elevated temperature at which the oil is liquid and in any case no greater than 100° C. with intensive stirring, in the presence of a water soluble emulsifying agent, the aqueous phase having a pH within the range of 5 to 11 causing partial solidification of the dispersed phase by cooling and effecting partial phase inversion of the dispersion by mechanical working, said emulsifying agent containing at least one emulsifier which is both sufficiently hydrophilic to allow the preparation of the highly packed oil in water emulsion and sufficiently lipophilic to stabilize the partially inverted oil in water emulsion.

5. A method as claimed in claim 4 in which the emulsifier is soluble in the aqueous phase at temperatures at which the highly packed emulsion is formed but only partially soluble at temperatures at which partial phase inversion is effected.

6. A method of preparing a fatty product comprising preparing a highly packed oil in water emulsion containing at least 74% by volume of oil by adding a fatty oil to an aqueous phase at an elevated temperature at which the oil is liquid and in any case no greater than 100° C. with intensive stirring, in the presence of a water soluble emulsifying agent, the aqueous phase having a pH within the range of 5 to 11 causing partial solidification of the dispersed phase by cooling and effecting partial phase inversion of the dispersion by mechanical working, said emulsifying agent containing at least one emulsifier which is both sufficiently hydrophilic to allow the preparation of the highly packed oil in water emulsion and sufficiently lipophilic to stabilize the partially inverted oil in water emulsion, said emulsifier being a condensation product of a higher fatty acid and a lower amino carboxylic acid of the general formula

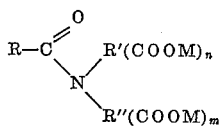

in which

R is a saturated hydrocarbon radical with at least 14 carbon atoms,
R' is a hydrocarbon radical with from 1 to 5 carbon atoms,
R" is a radical selected from the group hydrogen and hydrocarbon radicals with from 1 to 5 carbon atoms, which may be linked to R',
M is a radical selected from the group hydrogen, alkali metal, ammonium and substituted ammonium radicals,
m is 0 to 3, and
n is 1 to 3 and 2 or 3 when R" is hydrogen.

7. A method as claimed in claim 6 in which the emulsifier is a condensation product of a higher fatty acid and a protein hydrolyzate.

8. A method as claimed in claim 6 in which the emulsifier is sodium N-stearoyl sarcosine.

9. A method as claimed in claim 6 in which the emulsifier is sodium N-stearoyl glutaminate.

10. A method as claimed in claim 6 in which the emulsifier is sodium N-stearoyl proline.

11. A method of preparing a fatty product comprising preparing a highly packed oil in water emulsion containing at least 74% by volume of oil by adding a fatty oil to an aqueous phase at an elevated temperature at which the oil is liquid and in any case no greater than 100° C. with intensive stirring, in the presence of a water soluble emulsifying agent, the aqueous phase having a pH within the range of 5 to 11, causing partial solidification of the dispersed phase by cooling and effecting partial phase inversion of the dispersion by mechanical working, said emulsifying agent containing at least one emulsifier which is both sufficiently hydrophilic to allow the preparation of the highly packed oil in water emulsion and sufficiently lipophilic to stabilize the partially inverted oil in water emulsion, said emulsifier being a partial ester of phosphoric acid with a higher fatty alcohol.

12. A method as claimed in claim 11 in which the emulsifier is the sodium salt of monostearyl phosphoric acid.

13. A method of preparing a fatty product comprising preparing a highly packed oil in water emulsion containing at least 74% by volume of oil by adding a fatty oil to an aqueous phase at an elevated temperature at which the oil is liquid and in any case no greater than 100° C. with intensive stirring, in the presence of a water soluble emulsifying agent, the aqueous phase having a pH within the range of 5 to 11, causing partial solidification of the dispersed phase by cooling and effecting partial phase by cooling inversion of the dispersion by mechanical working, said emulsifying agent containing at least one emulsifier which is both sufficiently hydrophilic to allow the preparation of the highly packed oil in water emulsion and sufficiently lipohpilic to stabilize the partially inverted oil in water emulsion, said emulsifier being an alkali metal salt of a higher fatty acid.

14. A method as claimed in claim 13 in which the emulsifier is sodium stearate.

15. A method as claimed in claim 13 in which the emulsifier is sodium palmitate.

16. A method of preparing a fatty product comprising preparing a highly packed oil in water emulsion containing at least 74% by volume of oil by adding a fatty oil to an aqueous phase at an elevated temperature at which the oil is liquid and in any case no greater than 100° C. with intensive stirring, in the presence of a water soluble emulsifying agent, the aqueous phase having a pH within the range of 5 to 11, causing partial solidification of the dispersed phase by cooling and effecting partial phase inversion of the dispersion by mechanical working, said emulsifying agent containing at least one emulsifier having hydrophilic characteristics and at least one other emulsifier having lipophilic characteristics, the proportions of such emulsifiers in the agent being such that the agent is sufficiently hydrophilic to allow the preparation of the highly packed oil in water emulsion and sufficiently lipophilic to stabilize the partially inverted oil in water emulsion.

17. A method as claimed in claim 16 in which at least one emulsifier is selected from the group anionic and nonionic capillary active substances having pronounced hydrophilic properties and at least one emulsifier is selected from the group anionic and nonionic capillary active substances, having lipophilic properties.

18. A method of preparing a fatty product comprising preparing a highly packed oil in water emulsion containing at least 74% by volume of oil by adding a fatty oil to an aqueous phase at an elevated temperature at which the oil is liquid and in any case no greater than 100° C. with intensive stirring, in the presence of a water soluble emulsifying agent, the aqueous phase having a pH within the range of 5 to 11, causing partial solidification of the dispersed phase by cooling and effecting partial phase inversion of the dispersion by mechanical working, said emulsifying agent containing at least one emulsifier having hydrophilic characteristics and being a condensation product of a higher fatty acid and a lower amino carboxylic acid of the general formula

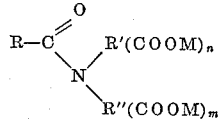

in which

R is a radical selected from the group saturated hydrocarbon radicals with from 8 to 13 carbon atoms and unsaturated aliphatic hydrocarbon radicals with at least 8 carbon atoms,
R' is a hydrocarbon radical with from 1 to 5 carbon atoms, R″ is a radical selected from the group hydrogen and hydrocarbon radicals with from 1 to 5 carbon atoms, which may be linked to R′, M is a radical selected from the group hydrogen, alkali metal, ammonium and substituted ammonium radicals, $m$ is 0 to 3, and $n$ is 1 to 3, and at least one other emulsifier having lipophilic properties and being a partial ester of polyglycerol and intermolecularly esterified ricinoleic acid, the proportions of such emulsifiers in the agent being such that the agent is sufficiently hydrophilic to allow the preparation of the highly packed oil in water emulsion and sufficiently lipophilic to stabilize the partially inverted oil in water emulsion.

19. A method as claimed in claim 16 in which the first emulsifier is sodium N-oleoyl sarcosine and and the second emulsifier is sorbitan mono oleate.

20. A method as claimed in claim 16 in which the first emulsifier is a sodium salt of lauric acid and the other emulsifier is a partial ester of polyglycerol and intermolecularly esterified ricinoleic acid.

21. A method as claimed in claim 16 in which the first emulsifier is a sodium salt of lauric acid and the other emulsifier is sorbitan mono oleate.

References Cited in the file of this patent

UNITED STATES PATENTS

| | | |
|---|---|---|
| 1,917,258 | Harris | July 11, 1933 |
| 2,063,987 | Dreyfus | Dec. 15, 1936 |
| 2,098,010 | Newton et al. | Nov. 2, 1937 |
| 2,197,457 | Werk et al. | Apr. 16, 1940 |
| 2,330,986 | Miller et al. | Oct. 5, 1943 |
| 2,395,051 | Horeman et al. | Feb. 19, 1946 |
| 2,422,486 | Johnston | June 17, 1947 |
| 2,508,393 | Jaeger | May 23, 1950 |
| 2,526,302 | Turgasen | Oct. 17, 1950 |
| 2,590,046 | Schoenfeld | Mar. 18, 1952 |
| 2,609,300 | Storrs | Sept. 2, 1952 |

FOREIGN PATENTS

| | | |
|---|---|---|
| 650,481 | Great Britain | Feb. 28, 1951 |